United States Patent
Shimamura et al.

[11] Patent Number: 6,144,197
[45] Date of Patent: Nov. 7, 2000

[54] ROTATIONAL SPEED DEVICE WITH MAGNETO-ELECTRIC ELEMENTS

[75] Inventors: Hiroshi Shimamura; Shinjiro Ueda, both of Katano, Japan

[73] Assignee: Matsushita Electric Industrial Co., Ltd., Osaka, Japan

[21] Appl. No.: 09/230,894
[22] PCT Filed: Jun. 1, 1998
[86] PCT No.: PCT/JP98/02403
§ 371 Date: Feb. 2, 1999
§ 102(e) Date: Feb. 2, 1999
[87] PCT Pub. No.: WO98/55834
PCT Pub. Date: Dec. 10, 1998

[30] Foreign Application Priority Data

Jun. 2, 1997 [JP] Japan ................................. 9-143638

[51] Int. Cl.$^7$ ........................................................ G01P 3/48
[52] U.S. Cl. ..................... 324/166; 324/174; 324/207.21
[58] Field of Search ......................... 324/207.2, 165, 324/207.12, 207.25, 207.21, 160, 163, 166, 174; 318/466, 489; 341/15, 16, 3, 118

[56] References Cited

U.S. PATENT DOCUMENTS 5,168,274 12/1992 Wakamatsu ......................... 341/15

FOREIGN PATENT DOCUMENTS 5-332787 12/1993 Japan.
9-196943 7/1997 Japan.

OTHER PUBLICATIONS

Japanese search report for Int'l Appln No. PCT/JP98/02403 dated Aug. 25, 1998.

Copy of Form PCT/ISA/210.

*Primary Examiner*—Christine K. Oda
*Assistant Examiner*—Subhash Zaveri
*Attorney, Agent, or Firm*—Ratner & Prestia

[57] ABSTRACT

A rotational speed-detecting device of the present invention drives a sensor means 11, which includes a detecting unit that connects magneto-electric elements in series. A comparison voltage generator connects comparison voltage resistors in series, and is connected in parallel with the detecting unit, with a constant voltage by a constant-voltage control means 13, to which constant voltage is supplied by a constant-voltage generating means 14. The constant voltage means 14 controls a constant current of the constant-current means 15 with an on-and-off output from a comparison means 12 so as to superpose and flow a rectangular wave current in a power supply line between Vcc and VR.

9 Claims, 4 Drawing Sheets

ROTATIONAL SPEED DEVICE WITH MAGNETO-ELECTRIC ELEMENTS

This application is a U.S. National Phase Applications of PCT International Application PCT/JP98/02403.

FIELD OF THE INVENTION

The present invention relates to a rotational speed-detecting device provided with a signal processing circuit for detecting a variation of magnetic leakage flux produced by a rotating or moving multi-polar magnet or a variation of magnetic leakage flux produced between a gear of magnetic moving body and a fixed magnet by utilizing a magneto-electric element, and for executing a voltage-current conversion by shaping waveform of the detected signal.

BACKGROUND OF THE INVENTION

A detecting element of the prior art for detecting rotation of a gear is a magnetic coil 102 coupled with a bias magnet 103, as shown in FIG. 6, so as to gain an induced voltage across the coil by detecting a variation of magnetic flux density due to a change of magneto-resistance produced by projections and depressions of a rotating gear 101. In this instance, the rotating gear 101, the bias magnet 103 and the magnetic coil 102 are considered as a generator, and a magnitude of the induced voltage depends upon a rotational speed, and a signal is detectable with two lines. Although it is a simple and inexpensive structure, it has a fundamental problem in that the induced voltage decreases at low speed.

It is also known that a ferromagnetic magneto-resistance element 104 is used as a detecting element in combination with a signal processing circuit 105 for superposing a rectangular wave current on a power supply line by a constant-current drive, as shown in FIG. 7. It utilizes a pair of current-miller circuits for the constant-current drive, in which a current of one of the current-miller circuits is kept flown at all the time, while a current of the other current-miller circuit is turned on and off by an output signal at a midpoint of the ferromagnetic magneto-resistance element 104 of a half bridge, so as to produce a rectangular wave current, and superposes the rectangular wave current on the power supply line in order to reduce a signal output line and to convert three lines into two lines.

In recent years, a performance required of a rotational sensor for vehicle installation is an ability to detect rotation at an extremely low speed.

Detecting elements suitable for this purpose are so-called magneto-electric elements of positional detection type, such as a Hall element, a ferromagnetic magneto-resistance element, and a semiconductor magneto-resistance element. The semiconductor magneto-resistance element, in particular, is one of the most suitable for detecting a rotational gear, since it produces a high detection signal voltage. If a magneto-electric element of positional detection type is used for the rotational sensor, two current supply lines and one signal output line, for a sum of three lines are generally needed to constitute the circuit. A rotational sensor capable of detecting an extremely low speed with two lines is desirable, however, in consideration of compatibility with a magnetic coil, reduction of a vehicle weight, effective usage of a cab space, etc. A two-line system in a rotational speed-detecting device of the positional detection type detects a variation of magnetic leakage flux produced by a rotating or moving body with a magneto-electric element, and superposes a rectangular wave current on the power supply line after signal processing, so as to reduce a number of a signal output line by way of calculating the number of rotations or the amount of movement of the rotating or moving body with a computer by detecting a voltage across a resistor inserted in the power supply line at a power supply terminal. This method requires to reduce absolute values and a relative difference of a high current value and a low current value of the rectangular wave as small as possible, in order to reduce a power consumption of the entire circuit and to hold down heat generation of the circuit elements as little as possible. On the other hand, the smaller it is to keep an absolute current value of the rectangular wave current, the more important a preciseness of the current value of the rectangular current waveform is, in order to reliably recognize the high current value and the low current value of the rectangular wave. For this reason, a method has been used in the past in which a current consumption of an entire signal processing circuit is controlled by using a constant-current circuit.

In the rotational sensor, if a semiconductor magneto-resistance element (hereinafter referred to as "SMR") is used for the detection unit, as in the past, the fluctuation of resistance value is so large due to temperature, e.g., a variation in an extent of approximately 50 times in the resistance value within a range of −40° C. to 150° C., although an output is high under a condition of strong magnetic field. Therefore, the following problems arise when it is driven with a constant current.

(1) Since a resistance value of the SMR is low at high temperature, a detecting output becomes lower at low resistance as compared to the detecting output at high resistance, considering a reduction of the magnetic sensitivity by approximately 30%, coupled with a decrease in the amount of change in the resistance. Therefore, it falls into a state wherein a comparator is unable to provide an on-and-off operation taking into consideration a drift of the circuit elements, a hysteresis, and a temperature drift at a midpoint of the magneto-electric element.

(2) If the SMR and a comparison voltage generating unit are driven together with a constant current under the normal temperature condition, a noise margin becomes smaller, since a voltage across the SMR constituting a half bridge changes due to a variation in resistance value of the SMR caused by its rotation, which also leads to a change in a midpoint voltage of a comparison voltage resistor.

Also, there has been a problem of an increase in the cost with ferromagnetic magneto-resistance elements (hereinafter referred to as "MR") if it is used for the detecting unit in a rotational sensor of the prior art, because it has a smaller rate of change of magneto-resistance than the SMR. It requires a power element for the circuit element as a current value of the rectangular wave current increases if a constant-current driving current is increased in order to obtain a large output. It requires more number of circuit elements in order to amplify output of the element output if the driving current is decreased, since the MR output becomes smaller as in case of the SMR, thereby resulting the comparator being unable to provide an on-and-off operation, taking into consideration a drift of the circuit elements, a hysteresis and a temperature drift at a midpoint of the magneto-electric elements.

Moreover, in either case of utilizing the SMR or the MR, there has been a problem in securing an accurate current value for the rectangular wave current and making the circuit structure as simple as possible at the same time over a variational range of the power supply voltage and a variational range of servicing temperature, with an indispensable condition of reduction in both size and cost, in consideration of compatibility with a magnetic coil.

SUMMARY OF THE INVENTION

A first object of the present invention is to provide a rotational speed-detecting device capable of obtaining a rectangular wave current having a good current accuracy even under variations of ambient temperature (−40° C. to 150° C.) and power supply voltage (8 V dc to 16 V dc).

A second object of the present invention is to provide a rotational speed-detecting device, of which circuit structure can be simplified, and is of a two-line type, yet it is capable of detecting an extremely low speed.

In order to solve the above problems, a rotational speed-detecting device of the present invention includes: a sensor means including a detecting unit, which connects magneto-electric elements of positional detection type in series, and a comparison voltage generating unit, which connects comparison voltage resistors in series and is connected in parallel with the detecting unit; a comparison means connected to each of a midpoint of the detecting unit and a midpoint of the comparison voltage generating unit constituting the sensor means; a constant-voltage control means provided between a supply terminal of power supply line and the sensor means for supplying constant voltage to the sensor means; a constant-voltage generating means provided between the supply terminal and a return terminal of the power supply line for supplying constant voltage to the constant-voltage control means; and a constant-current means provided between the supply terminal and the return terminal of the power supply line for determining a constant current flown by the constant-voltage generating means between the supply terminal and the return terminal, wherein a rectangular wave current is superposed and flown in the power supply line by controlling a constant current of the constant-current means with an on-and-off output from the comparison means, so that a rectangular wave voltage is detected across a load provided between the return terminal of the power supply line and the ground.

The above structure is able to provide a rotational speed-detecting device of two-line type, which is capable of superposing a rectangular wave current having a small absolute value and relative difference in current value of the rectangular wave currents onto the power supply line, with an excellent accuracy of the rectangular wave current, even if the power supply voltage changes and if an ambient temperature varies.

Also, the magneto-electric elements of positional detection type in the detecting element unit and the comparison voltage resistor unit for comparing a waveform detected by the magneto-electric elements of positional detection type, which can be a major factor of dispersion in current value of the rectangular wave current, are driven with a constant voltage.

Under the situation of driving the sensor means with the constant voltage, as described above:

(1) In Case of Using a SMR

Although an output of the SMR decreases with a low supply voltage since the output varies in proportion to the supply voltage, dispersion of current value caused by a variation of resistance value due to temperature, which is a major factor of the dispersion in current value of the rectangular wave current, can be suppressed by driving the SMR with a low constant voltage, taking advantage of a characteristic of the SMR of which detection output is quite large. As the SMR shows a very large variation in resistance value with temperature as stated above, a composite resistance of the two SMRs that constitute a half bridge changes from 1.6 kΩ to 80 kΩ, for instance, in a temperature variation range of −40° C. to 150° C. A composite resistance value Y, which is made out of the SMRs of the half bridge and the comparison voltage resistor unit of another half bridge, is given by the following formula, if the composite resistance value of the two SMRs is X (variable) and the composite resistance value of the two comparison voltage resistors is A (constant):

$Y = A \, X/(X+A)$

The Y increases monotonously relative to the variable X, and every Y values fall between a minimum Y value when the X is at the minimum and a maximum Y value when the X is at the maximum. Calculated values of the current flown through the Y, with the minimum composite resistance value, 1.6 kΩ, of the SMR at the ambient temperature of 150° C. and the maximum composite resistance value, 80 kΩ, at the ambient temperature of −40° C., when the resistance value A of the comparison voltage resistors is changed, are shown in Table 1:

where, a voltage applied to the Y is 3 V dc;

I max is a maximum current value flown in the Y;

I min is a minimum current value flown in the Y; and

ΔI=I max−I min.

TABLE 1

| A (kΩ) | I max (mA) | I min (mA) | ΔI (mA) |
| --- | --- | --- | --- |
| 0.2 | 16.8750 | 15.0375 | 1.8375 |
| 1.0 | 4.8750 | 3.0375 | 1.8375 |
| 2.0 | 3.37650 | 1.5375 | 1.8375 |
| 5.0 | 2.4750 | 0.6375 | 1.8375 |
| 10.0 | 2.1750 | 0.3375 | 1.8375 |
| 20.0 | 2.0250 | 0.1875 | 1.8375 |
| 50.0 | 1.9350 | 0.0975 | 1.8375 |

From the above values, it can be said with regard to the signal detecting unit having a large dispersion factor of current value, that:

(a) differences between the maximum values and the minimum values of the current are constant at 1.8375 mA regardless of a resistance value of the comparison voltage resistors.

(b) a value of the A of the comparison voltage resistors determines a magnitude of the current value that flows through the Y.

Accordingly, a dispersion of the detecting unit can be regulated for a constant current in an accuracy of ±1.8375/2 mA, if it is driven with 3 V dc. The constant voltage stabilization can prevent a variation of the comparison voltage associated with a variation in resistance value of the SMR along with a movement of the moving body, and makes a noise margin larger than the one that is driven with a constant current, and enables the signal detecting unit to stabilize a current. In case of the SMR, dispersion of current in the detecting unit can be restricted to a small value by driving it with a low constant voltage, taking advantage of a characteristic of the SMR of which detection signal output is larger than other detecting elements of positional detection type.

(2) In Case of Using a MR

An output (V0) of the MR varies in proportion to a magnitude of the driving voltage applied across both ends of the half bridge.

$$V0 = (\delta R/R) \times Vd/(2 - \delta R/R)$$

where, δR/R is a rate of variation in the magneto-resistance; and

Vd is the driving voltage.

Therefore, a large output of the MR is obtainable by driving it with a large Vd. Current dispersion of the detecting unit can be held at a small level, because the variation in resistance value is approximately one and a half times in a range of the servicing temperature of −40° C. to 150° C.

DESCRIPTION OF THE PREFERRED EMBODIMENTS

Figure 1:
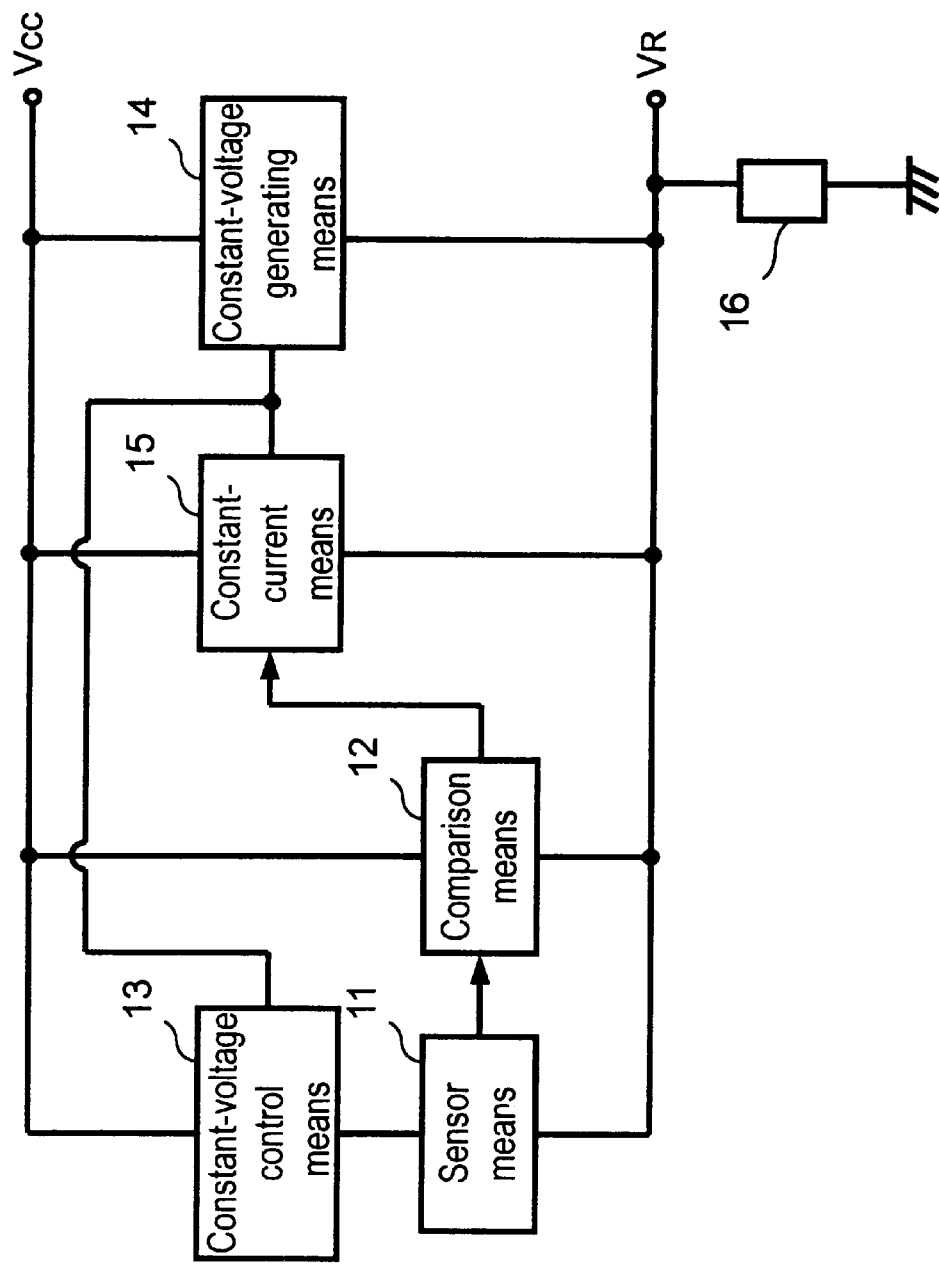
FIG. 1 depicts an electrical block diagram of a rotational speed-detecting device of an exemplary embodiment of the present invention.
Figure 2:
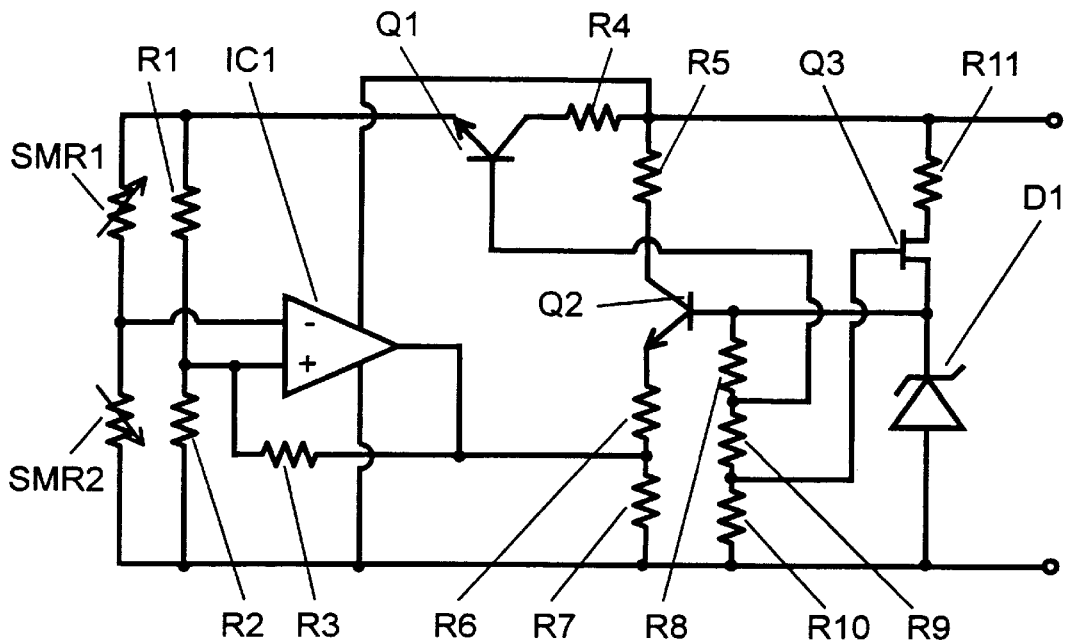
FIG. 2 depicts a concrete electrical circuit diagram of the same device.

An exemplary embodiment of a rotational speed-detecting device of the present invention is described by referring to figures. FIG. 1 depicts an electrical block diagram of the rotational speed-detecting device of an exemplary embodiment of the present invention, and FIG. 2 depicts a concrete circuit diagram of the same device. In FIG. 1 and FIG. 2, a sensor means 11 includes a detecting unit, which connects magneto-electric elements of positional detection type in series, and a comparison voltage generating unit, which connects comparison voltage resistors in series and is connected in parallel with the detecting unit. A comparison means 12 connects to each of a midpoint of the detecting unit and a midpoint of the comparison voltage-generating unit constituting the sensor means 11. A numeral 13 represents a constant-voltage control means provided between a supply terminal Vcc of a power supply line and the sensor means 11 for supplying constant voltage to the sensor means 11. A constant-voltage generating means 14 is provided between the supply terminal Vcc and a return terminal VR of the power supply line for supplying constant voltage to the constant-voltage control means 13 and a constant current means 15. The constant-current means 15 is provided between the supply terminal Vcc and the return terminal VR of the power supply line for determining a constant current flown by the constant-voltage generating means 14 between the supply terminal and the return terminal. They operate in a manner that a rectangular wave current is superposed and flown in the power supply lines by controlling the constant current of the constant-current means 15 with in on-and-off output signal from the comparison means 12, so that a rectangular wave voltage is detected across a load 16 provided between the return terminal VR of the power supply line and the ground.

In FIG. 2, the constant-voltage generating means 14 functions to generate a constant voltage even when the power supply voltage fluctuates, and it includes a field effect type transistor (hereinafter referred to as "FET") Q3, a Zener diode D1, dividing resistors R8, R9 and R10, and a resistor R11. The constant-current means 15 functions to switch the rectangular wave current between a high current value and a low current value by an on-and-off output signal of a comparator IC1, and it includes the Zener diode D1, the dividing resistors R8, R9 and R10, a transistor Q2 and resistors R5, R6 and R7. The constant-voltage control means 13 operates to drive the comparison-voltage resistors and the SMRs, and it includes the Zener diode D1, the dividing resistors R8, R9 and R10, a transistor Q1 and a resistor R4. The detecting unit functions to detect a variation of magnetic flux density associated with rotation of a gear and to produce a comparison voltage, and it includes the SMRs (SMR1 and SMR2). The comparison means 12 compares the detected signal with the comparison voltage, converts it into a pulse signal, and it includes the comparator IC1 and a hysteresis resistor R3. The resistors R4, R5 and R11 function as power consumption restricts resistors for the transistors Q1 and Q2, and the FET Q3.

Figure 3:
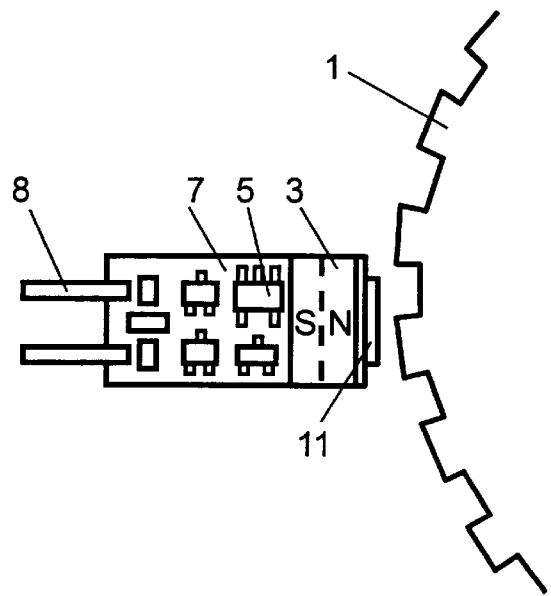
FIG. 3 is a structural drawing of the same device.

In the circuit, the sensor means 11, which includes the comparison-voltage generating unit and the detecting unit that is placed between a bias magnet 3 and a gear 1, as shown in FIG. 3, and it detects a variation of magnetic flux density associated with rotation of the gear 1. And, the comparison means 12, the constant-voltage control means 13, the constant-voltage generating means 14, the constant-current means 15, etc. are constructed on a flexible substrate 7 as a signal processing circuit 5 for outputting through a terminal 8 which also serves for the power supply.

A circuit operation of the signal processing circuit of the exemplary embodiment of the present invention is described in detail. A variation of leakage flux due to movement of a moving body of magnetic material or a multi-polar magnet is differentially detected by the SMR1 and SMR2 constituting a half bridge, and the comparator IC1 compares the comparator IC1 with a comparison voltage produced by a resistance-dividing method, and an output of an open-collector of the comparator IC1 is turned on and off. The SMRs of the detecting unit and the comparison-voltage generating unit are driven by a constant-voltage circuit stabilized with a voltage determined by the Zener diode D1. The comparator IC1 contains an IC, which is stabilized with a constant current, and is connected directly to the power supply line. A bias current of the Zener diode D1 is supplied by the FET Q3. The SMRs have a resistance-temperature characteristic in which a composite resistance of approximately 8 kΩ at the normal temperature (25° C.) changes to approximately 80 kΩ at a low temperature (−40° C.) and approximately 1.6 kΩ at a high temperature (150° C.). The smaller the driving voltage value (Vd) is, the smaller a current dispersion due to changes in temperature of the SMRs' resistance in the sensor means 11 is, which includes the SMRs and the comparison voltage generating unit and the value becomes ±(1.8375/2)×(Vd/3) mA, where Vd is the driving constant voltage, and the ±1.8375/2 mA is a dispersed current of the sensor means 11 when Vd=3 V. The constant-current means 15 possesses a constant-current value determined by an emitter voltage and an emitter resistor of the transistor Q2 that operates with a voltage determined by the Zener diode D1, and an output of the comparator IC1 having an open collector is connected to a part of the emitter resistor. When the open collector of the comparator IC1 is in a non-conductive state, the power supply line is superposed with a low current value of the rectangular wave current consisting of the constant current determined by the emitter voltage and the emitter resistor of the transistor Q2 of the constant-current means 15 and currents flowing to the detecting unit, the comparison means 12 and the constant-voltage generating unit 14, and, when the open collector of the comparator IC1 is in a conductive state, the power supply line is superposed with a high current value of the rectangular wave current by dividing the emitter current of the transistor Q2 of the constant-current means 15. The emitter resistor for the transistor Q2 is adjusted of its resistance value by trimming, etc. in order to fix a current value of the rectangular wave current at a predetermined value. Since the constant-voltage generating unit 14 supplies a bias current of the Zener diode D1 with a drain current of the FET Q3, and the FET Q3 is biased between a gate and a source in a manner to minimize a variation of the drain current relative to temperature changes, the drain current becomes nearly constant through a wide range of the supply voltage variation and a wide range of temperature change, so that an excellent constant-voltage characteristic is attained against the supply voltage variation. In addition, since a temperature characteristic of a Zener voltage $V_z$ and a temperature characteristic of a base-emitter voltage Vbe of the transistors Q1 and Q2 in the constant-current means 15 and the constant-voltage control means 13 cancel with each other, individual emitter voltages indicate approximately constant values relative to the variation in temperature through the servicing temperature range.

As a result of the above, the rectangular current waveform with a maximum current dispersion of ±2 mA or less is obtainable for a maximum value of 20 mA and a minimum value of 10 mA of the rectangular wave current in a supply voltage range of 8 V to 16 V at the servicing temperature of −40° C. to 150° C., with a structure composed of the sensor means 11 having the detecting unit of the SMRs and the voltage generating unit of the comparison voltage resistors, the comparison means 12, the constant-current means 15 by an emitter current of the transistor Q2, and the constant-voltage generating means 14 of the FET and the Zener diode. The circuit consists of one FET, one Zener diode and two transistors, so that a simple structure with a total of four active elements enables an accurate voltage-current conversion and a reduction into a two-line circuit.

Figure 4:
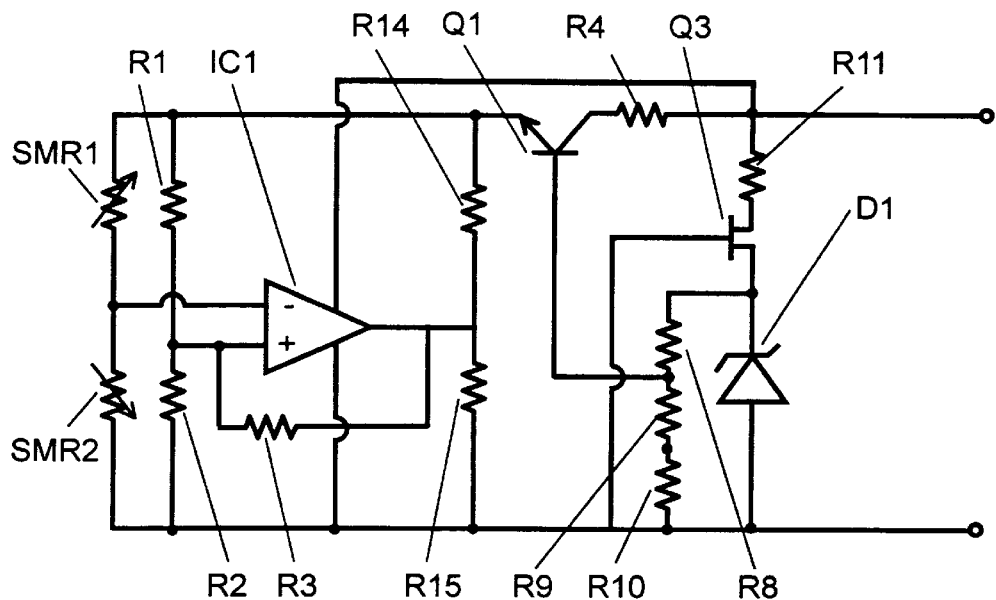
FIG. 4 is an electrical circuit diagram showing another exemplary embodiment of the present invention.

Although in the described embodiment, the constant-current means 15 and the constant-voltage control means 13 employ the transistors Q1 and Q2 respectively, they can commonly use the transistor Q1, instead, as shown in FIG. 4, and divide it with emitter resistors R14 and R15. This is suitable if current values of the rectangular wave current are small when it is on and off.

Figure 5:
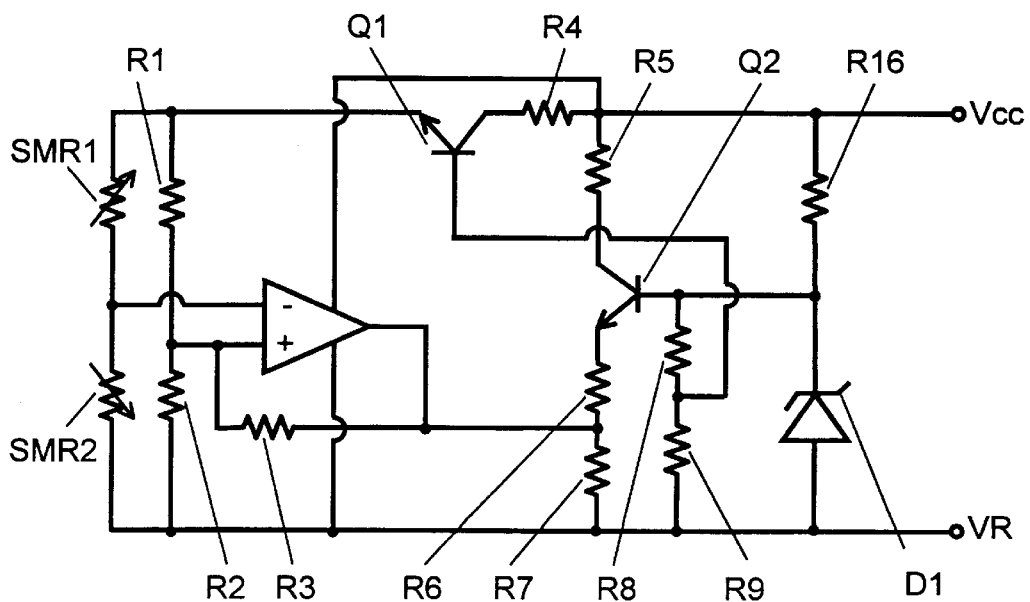
FIG. 5 is an electrical circuit diagram showing still another exemplary embodiment of the present invention.
Figure 6:
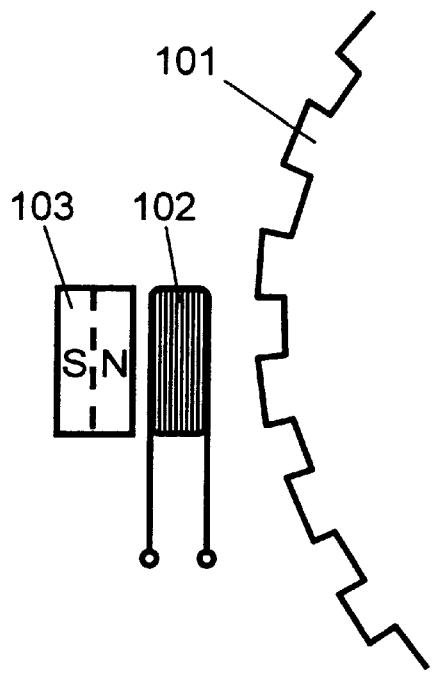
FIG. 6 is a structural drawing depicting a rotational speed-detecting device of the prior art.
Figure 7:
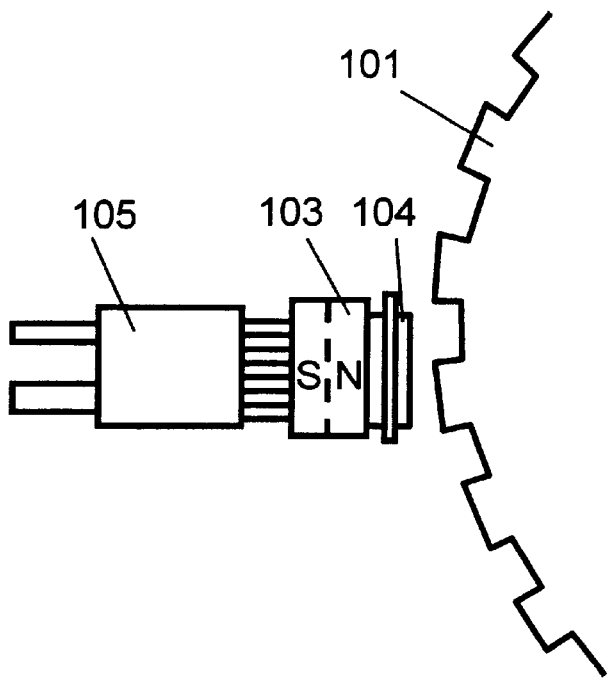
FIG. 7 is a structural drawing depicting another rotational speed-detecting device of the prior art.

Also, the FET Q3 of the constant-voltage generating means 14 may be replaced by a resistor 16, as shown in FIG. 5. In this case, a stable constant voltage is obtainable even under fluctuation of the power supply voltage Vcc, by using a Zener diode capable of generating a constant voltage at a low current bias value.

Furthermore, although current value of the rectangular wave current is obtained by changing the emitter resistor of the transistor Q1 or Q2 in the constant-current means 15, an improvement in accuracy of the constant current value is obtainable by adjusting the resistance value by trimming.

As has been described, the present invention is able to provide the following effects through an extent of a wide range of servicing temperature (−40° C. to 150° C.) and a wide range of power supply voltage (8 V dc to 16 V dc), even when using a magnetic detecting element of which resistance value changes significantly by temperature.

(1) Since a SMR and a comparison voltage generating unit are driven with a low constant voltage, a current dispersion of a detecting unit can be held at a small value (given by (1.8735/2)×(Vd/3) mA, so that the dispersion is reduced by setting the Vd of a small value) even when there is a significant change in resistance of the SMR, so that a rectangular wave current of an excellent current accuracy is obtainable as a whole of the circuit.

(2) In case of using a MR having a small rate of variation in the magneto-resistance, a MR output is increased by setting a driving voltage large, so as to enable it to convert to a rectangular wave current without an amplifier, and to reduce a current value of the rectangular wave current, thereby avoiding use of a power element for the circuit element.

(3) A two-lined signal processing circuit can be realized with a simple circuit structure.

What is claimed is:

1. A rotational speed-detecting device comprising:
   sensor means including a detecting unit which includes magneto-electric elements of positional detection type coupled in series, and a comparison voltage generating unit which includes comparison voltage resistors coupled in series, said comparison voltage generating unit is coupled in parallel with said detecting unit;
   comparison means coupled to said detecting unit of said sensor means and to said comparison voltage generating unit;
   a power supply line having a supply terminal and a return terminal;
   constant-voltage control means coupled to said supply terminal of said power supply line and said sensor means, said constant-voltage control means for supplying constant voltage to said sensor means;
   constant-current means coupled to said supply terminal and said return terminal of said power supply line, said constant-current means for determining a constant current flow between said supply terminal and said return terminal; and
   constant-voltage generating means coupled to said supply terminal and said return terminal of said power supply line, said constant-voltage generating means for supplying constant voltage to said constant-voltage control means and said constant-current means,
   wherein a rectangular wave current is superimposed on the current flow in said power supply line by controlling a constant current of said constant-current means with an on-and-off output signal from said comparison means, so that a rectangular wave voltage is detectable across a load coupled between said return terminal of said power supply line and a ground.

2. The rotational speed-detecting device according to claim 1, wherein said constant-current means comprises said constant-voltage control means.

3. The rotational speed-detecting device according to claim 1, wherein a current value of the rectangular wave current is determined by a resistance value of a resistor in said constant-current means.

4. A rotational speed detecting device comprising:
   sensor means including i) a detecting unit including magneto-electric elements coupled in series and ii) a comparison voltage generating unit including resistors coupled in series, said comparison voltage generating unit being coupled in parallel with said detecting unit;

comparison means adapted for receiving a midpoint voltage of said detecting unit and a midpoint voltage of said comparison voltage generating unit, and outputting a two level voltage output signal based on a detecting voltage of said magneto-electric elements;

a supply terminal;

a return terminal;

constant-voltage control means connected to said supply terminal and said sensor means, and for supplying constant voltage to said sensor means;

constant-current means for determining a constant current between said supply terminal and said return terminal based on the output signal from said comparison means; and constant-voltage generating means connected to said supply terminal, said return terminal, said constant-voltage control means and said constant-current means, and for supplying a constant voltage to said constant-voltage control means and said constant-current means.

5. The rotational speed detecting device according to claim 4, wherein said constant-current means comprises said constant-voltage control means.

6. The rotational speed detecting device according to claim 5, wherein a load resistor is connected between said return terminal and a ground, so that revolutions of a gear are measured by detecting rectangular wave voltages generated between opposite ends of said load resistor.

7. The rotational speed-detecting device according to claim 4, wherein said constant-current means includes a resistor for determining the constant current.

8. The rotational speed detecting device according to claim 7, wherein a load resistor is connected between said return terminal and a ground, so that revolutions of a gear are measured by detecting rectangular wave voltages generated between opposite ends of said load resistor.

9. The rotational speed detecting device according to claim 4, wherein a load resistor is connected between said return terminal and a ground, so that revolutions of a gear are measured by detecting rectangular wave voltages generated between opposite ends of said load resistor.

* * * * *